United States Patent [19]

Turris et al.

[11] Patent Number: 4,816,106
[45] Date of Patent: Mar. 28, 1989

[54] METHOD FOR THE CONTROLLED CURING OF COMPOSITES

[75] Inventors: Fabrizio R. S. Turris, Pomigliano; Salvatore Pagliuso, Arzano, both of Italy

[73] Assignee: Aeritalia Saipa - Gruppo Velivoli da Trasporto, Naples, Italy

[21] Appl. No.: 923,979

[22] Filed: Oct. 28, 1986

Related U.S. Application Data

[63] Continuation-in-part of Ser. No. 681,499, Dec. 13, 1984, abandoned.

[51] Int. Cl.$^4$ .............................................. B32B 31/00
[52] U.S. Cl. .................................... 156/285; 156/289; 264/102; 264/510
[58] Field of Search ................. 156/87, 285, 286, 252, 156/289, 323, 381, 382; 264/102, 510, 511, 130, 101, 512

[56] References Cited

U.S. PATENT DOCUMENTS

| | | |
|---|---|---|
| 2,713,378 | 7/1955 | Nadher et al. ........................ 154/1 |
| 3,025,208 | 3/1962 | Geiger ................................. 156/382 |
| 3,067,507 | 12/1962 | Titys et al. ......................... 29/471.1 |
| 3,072,225 | 1/1963 | Cremer et al. ...................... 189/34 |
| 3,553,054 | 1/1971 | Maus .................................. 156/382 |
| 3,666,600 | 3/1969 | Yoshino .............................. 156/382 |
| 3,703,422 | 11/1972 | Yoshino .............................. 156/87 |
| 4,065,340 | 12/1977 | Dickerson .......................... 156/286 |
| 4,216,047 | 8/1980 | Hilliard et al. ..................... 156/286 |
| 4,311,661 | 1/1982 | Palmer ............................... 264/102 X |
| 4,350,545 | 9/1982 | Garabedian ........................ 156/286 X |
| 4,562,033 | 12/1985 | Johnson et al. ................... 264/102 X |

FOREIGN PATENT DOCUMENTS

WO80/02528 11/1980 PCT Int'l Appl. ................. 156/286

OTHER PUBLICATIONS

Newsam, S. M., "Vacuum Molding of . . . Reinforced Composite Components", S.A.M.P.E. Public, (London–1983), Aug. 8, 1983, pp. 26 (1)–(17).

Primary Examiner—Michael W. Ball
Assistant Examiner—Ramon R. Hoch
Attorney, Agent, or Firm—Fulwider, Patton, Rieber, Lee & Utecht

[57] ABSTRACT

A composite structure is prepared in a mold using an elastic diaphragm which allows the application of a uniformly distributed pressure during a curing cycle. The elastic diaphragm seals a resin impregnated lay-up throughout the curing cycle during which the lay-up is heated and compressed, and ensures a constant resin-to-reinforcement ratio by preventing the escape of resin from the lay-up as the viscosity of the resin is lowered during the initial stages of the curing cycle. In instances where entrapped air or volatile removal from the lay-up is necessary, a separate step including the application of a vacuum and/or heat to the lay-up can be performed prior to the final curing cycle.

26 Claims, 2 Drawing Sheets

4,816,106

METHOD FOR THE CONTROLLED CURING OF COMPOSITES

This is a continuation of application Ser. No. 681,499 filed Dec. 13, 1984 now abandoned.

BACKGROUND OF THE INVENTION

This invention relates generally to methods for forming composite structures, and, more specifically, to a method for forming composite structures utilizing an impervious flexible film which allows the application of a uniformly distributed pressure to a lay-up, and which tends to prevent the flow of resin out of the lay-up during a curing cycle.

It is well-known to use a vacuum bag molding process to supply desired compression on a resin impregnated lay-up while heat curing a composite structure. To obtain a quality part, it is often necessary to remove all of the entrapped air from the lay-up being formed into the composite structure, or gases emitted by the resindue to the polycondensation which may occur during the heat curing, depending on the resin utilized. While most prior systems which have provided for the escape of entrapped air or volatiles have successfully accomplished the intended task, they have necessarily also provided paths for the escape of excessive amounts of resin from the lay-up during the during cycle.

Most prior art systems have used various layers of breather materials, including glass cloths, porous mats, etc., which have been placed in communication with both the lay-up and the vacuum source. As the viscosity of the resin within the lay-up is lowered as a result of an increase in temperature during the curing cycle, catastrophic resin flows can result, yielding low strength, out of tolerance parts, pluged-up vacuum systems, and the like.

One solution to the problem of excessive resin bleeding or squeeze-out during the curing of composites is found in U.S. Pat. No. 4,216,047, issued Aug. 5, 1980, and entitled "NO-BLEED CURING OF COMPOSITES", wherein strips are provided which purportedly allow air to be completely removed from the lay-up during the initial stages of the curing cycle, but which close off when resin starts to flow into the breather strips. Notwithstanding the advance set forth in the aforementioned patent, practical experience has shown that the provision of breather strips in communication with both the resin impregnated lay-up and the vacuum source still allows resin to undesirably escape the lay-up during the curing cycle.

Another method utilized to restrict the resin flow out of the lay-up has been to perform the curing cycle using the so-called "stepped cure". During the stepped cure process, the lay-up is heated to a very precise temperature and held there for a certain time in an effort to effect a jelling of the resin without excessive bleeding or squeeze-out. Typically, a compacting action, using a pressure source external to the vacuum system, had to be started at a very precise moment during the curing cycle to avoid both excessive bleeding of resin from the lay-up and/or a consolidation of the resinous material within the lay-up without compaction.

Accordingly, there has been a need for a novel method for the curing of composites through which very precise control can be maintained of the resin-to-reinforcement ratio within the lay-up, by altogether preventing the squeeze-out of resin from the lay-up during the curinng cycle. It would be desirable if such a novel system could utilize highly elastic films which could be easily tailored to the particular shape of the composite structure to be formed. Moreover, the novel system must also provide for the evacuation of entrapped air within the lay-up, as well as for the removal of volatiles, when required. The present invention fulfills these needs and provides other related advantages.

SUMMARY OF THE INVENTION

The present invention resides in an improved method of making a composite structure which is economical, can be used under a wide variety of circumstances to form a wide variety of parts, and provides very precise control over the resin content of the cured composite structure. The method involved comprises generally the application of a release material to a mold, and subsequently placing a lay-up including uncured resin on the mold. This lay-up will ultimately be formed into the composite structure. The lay-up is covered with an impervious flexible film that forms a seal preventing the flow of uncured resin from the lay-up, and then is cured to form the composite part by heating it to a resin curing temperature while maintaining a uniformly distributed pressure on the surface of the impervious flexible film opposite the lay-up.

In one preferred form of the invention, the impervious flexible film is covered with a breather material which provides a cushion tending to uniformly distribute externally applied pressure over the entire surface area of the impervious flexible film. The lay-up, the impervious flexible film and the breather material are then enclosed within a bag sealed to the mold by means of sealing strips extending generally about the periphery of the bag and placed directly between the bag and the mold. During the curing process, the breather material is vented to atmosphere to create a pressure differential which tends to compress the lay-up uniformly.

This preferred method can be further modified by providing an adhesive tape capable of withstanding the curing temperature without combining with the resin of the lay-up, in a position generally overlying the periphery of the lay-up between the outer surface of the lay-up and the inner surface of the impervious flexible film. Such an adhesive tape tends to further insure that there will be no resin bleed-out from the lay-up during the curling cycle. Moreover, this adhesive tape can be used in combination with one or more strips of abrasive material positioned to securely hold the lay-up in a desired orientation throughout the curing cycle. Such anchoring of the lay-up through use of the abrasive material strips is advantageous where there may be some concern over shifting of the lay-up due to the reduced viscosity of the resinous material which usually occurs during the curing cycle.

In another preferred form, after the lay-up has been placed on the mold, the exposed surfaces of the lay-up are covered with additional release material. An inflatable bag having an outer impervious flexible surface is positioned adjacent the additional release material covering the exposed surfaces of the lay-up. This inflatable bag effectively seals the lay-up to prevent the flow of uncured resin during the curing cycle. By pressurizing the inflatable bag, the lay-up can be compressed during the curing cycle to increase the ultimate strength of the composite structure. Moreover, where the inflatable bag is pressurized by means of an autoclave system, that bag can be advantageously utilized to also simultaneously heat the lay-up to the resin curing temperature.

Where it is necessary to debulk the lay-up of any entrapped air, the present invention provides a simple method for such air removal after the lay-up has been placed on the mold and before the lay-up is covered with the impervious flexible film. More specifically, the lay-up can be debulked of excess air by depositing a strip of breather material about the periphery of the lay-up and directly over the mold covered by the release material. The lay-up and breather material are then enclosed within a vacuum bag sealed to the mold by means of sealing strips, and then the breather material is subsequently connected to a vacuum source for a minimum of ten minutes.

Likewise, volatiles can be removed from the lay-up before the lay-up is covered with the impervious flexible film by depositing a strip of breather material about the periphery of the lay-up and by interposing a layer of release material between the breather material and the lay-up to prevent resin migration. In a manner similar to that found in the debulking process, the lay-up and the breather material are enclosed within vacuum bag and connected to a vacuum source. The lay-up is then heated to a temperature which will permit the escape of volatiles, but will not reduce the viscosity of the resin within the lay-up to a point where it will flow past the release material and the bag into the breather material in any significant amounts.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
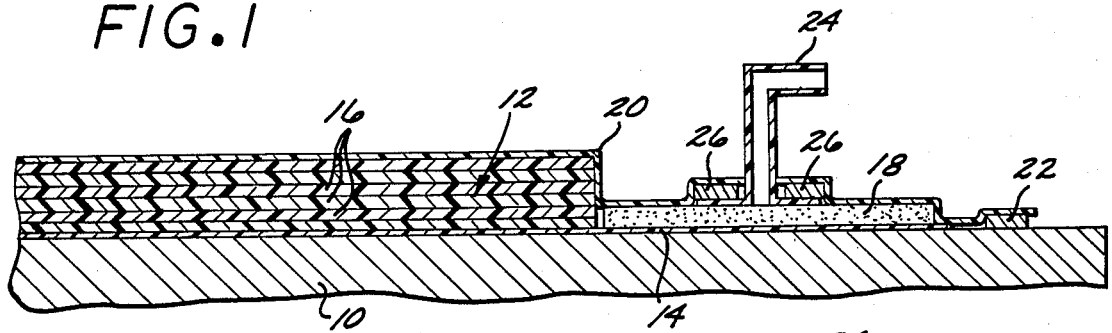
FIG. 1 is a fragmented, sectional schematic view of a bagging arrangement over a lay-up and a mold, the bagging arrangement designed to debulk the lay-up of any entrapped air.

As shown in the drawings for the purposes of illustration, the present invention is concerned with an improved method for the controlled curing of composites. generally, the improved method comprises the application of a release material to a mold and then placing a lay-up, including uncured resin, on the mold with the lay-up forming the composite structure after completion of a curing cycle. If necessary, the lay-up can be bagged and a vacuum applied to remove entrapped air or volatiles. The lay-up is covered with an impervious flexible film that forms a seal which prevents the flow of uncured resin from the lay-up during the curing cycle. With the impervious flexible film in place, the lay-up is heated to a resin curing temperature while maintaining a uniformly distributed pressure on the surface of the impervious flexible film opposite the lay-up, to supply the compression necessary for the formation of a high-strength composite structure.

In one preferred form, the impervious flexible film is covered with a breather material which provides a cushion tending to uniformly distribute externally applied pressure over the entire surface area of the impervious flexible film. This breather material, as well as the lay-up and the impervious flexible film, are then enclosed with a bag which is sealed to the mold by means of sealing strips extending generally about the periphery of the bag and placed directly between the bag and the mold. The breather material is vented to the atmosphere, and the lay-up is heated to the resin curing temperature while maintaining a uniformly distributed pressure on the bag surface opposite the lay-up. By venting the breather material to atmosphere, a pressure differential is created which permits the externally applied pressure to be distributed uniformly over the surface of the lay-up.

In another preferred form, the exposed surfaces of the lay-up are covered with additional release material after the lay-up has been placed on the mold. An inflatable bag having an outer impervious flexible surface is positioned adjacent the additional release material in a manner effectively sealing the lay-up to prevent the flow of uncured resin from the lay-up. As the lay-up is heated to a resin curing temperature, the inflatable bag is pressurized simultaneously to apply a generally uniformly distributed pressure onto the release material covering the exposed surfaces of the lay-up.

The improved method of this invention is desiged to efficiently control the precise amount of resin which is cured within the lay-up. Such is accomplished by preventing the escape of any resin from the lay-up during the curing cycle as the viscosity of the resin is lowered and caused to flow more freely. Moreover, to accomplish this result the present invention utilizes impervious flexible films which are advantageous for use in many composite parts manufacturing processes where non-uniform structural contours are routinely encountered. Furthermore, the present invention provides a convenient manner in which air can be evacuated from within the lay-up, as well as a manner in which volatiles can be removed from the lay-up, if necessary.

In accordance with the present invention, and as illustrated with respect to the first embodiment in FIGS. 1 through 5, the method for the controlled curing of composites includes the use of a mold, generally designated by the reference number 10, against which the composite structure is cured. While the mold 10 illustrated in the accompanying drawings is generally planar, it is to be understood that very few composite structures are planar as illustrated, and the mold can be fashioned into any shape desired. Prior to placing a lay-up 12 including uncured resin on the mold 10, a standard release agent or material 14 is deposited on the mold to facilitate removal of the composite structure upon completion of the curing cycle. The lay-up 12 can be a laminate, a sandwich or an integrally stiffened part which includes several layers 16 of a fiber reinforcement embedded in a thermosetting resin. Such a laminate including several layers 16 of fiber reinforcement embedded in a thermosetting resin is illustrated in all of the accompanying drawings.

With some types of lay-ups 12, and for particular applications, it may be desirable to debulk the lay-up of any entrapped air after it has been placed on the mold 10. As illustrated in FIG. 1, such debulking can be accomplished by depositing a strip of breather material 18 about the periphery of the lay-up 12 and directly over the mold 10 covered by the release material 14. The lay-up 12 and the breather material 18 are then enclosed within a vacuum bag 20 sealed to the mold 10 by means of sealing strips 22 extending generally about the periphery of the vacuum bag and placed directly between the vacuum bag and the mold. This vacuum bag 20 is provided an opening through which a connecting tube 24 extends to place the breather material 18 in direct communication with a vacuum source (not shown). Additional sealing strips 26 are utilized adjacent the connecting tube 24 to maintain a positive seal against which a vacuum can be pulled within the vacuum bag 20. It is presently preferred that a vacuum be maintained on the lay-up 12 through the breather material 18 for at least ten minutes to assure the evacuation of any air which may be entrapped. After the lay-up 12 has been satisfactorily debulked of any entrapped air, the vacuum bag 20 and the peripheral strips of breather material 18 can be removed from the mold 10 and the lay-up, allowing the method of the present invention to proceed as set forth below.

Figure 2:
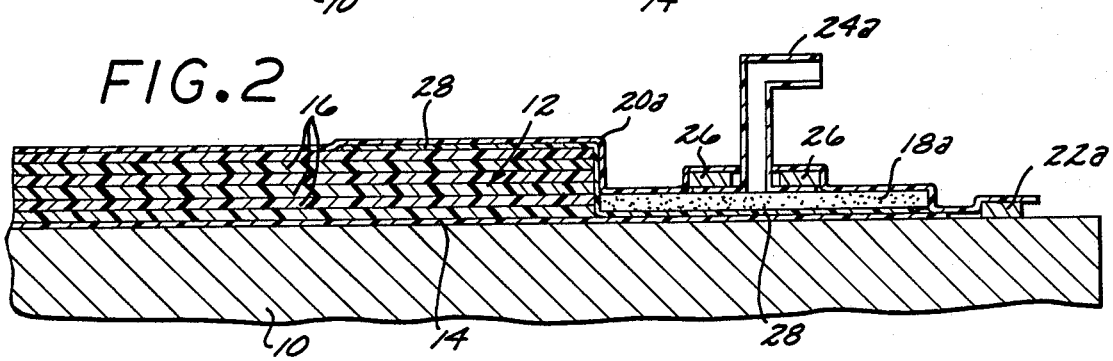
FIG. 2 is a fragmented, sectional schematic view of a bagging arrangement similar to that shown in FIG. 1, illustrating the manner in which an additional layer of release material is interposed between a vacuum bag and the lay-up to prevent resin flow during a volatiles removal step.

Prior to curing some composite structures, it is desirable to remove volatiles from the lay-up 12 before initiation of the curing cycle. As illustrated in FIG. 2, after the lay-up 12 has been deposited over the release material 14 adjacent the mold 10, volatiles removal can be effected by depositing a strip of breather material 18a about the periphery of the lay-up as set forth in connection with the process for evacuating air from the lay-up. An additional layer of release material 28 is preferably interposed between the breather material 18a and the lay-up 12 to prevent resin migration out of the lay-up. Once this has been accomplished, the lay-up 12 and the breather material 18a are enclosed within a vacuum bag 20a sealed to the mold 10 by means of sealing strips 22a extending generally about the periphery of the vacuum bag and placed directly between the vacuum bag and the mold. As was the case in the above-described process for evacuating air from the lay-up 12, a connecting tube 24a is provided to place the breather material 18a in communication with a vacuum source (not shown). The lay-up 12 is then heated up to a temperature which will permit the escape of volatiles, but will not reduce the viscosity of the resin within the lay-up to a point where it will flow past the release material 28 and the vacuum bag 20a into the breather material 18a in any significant amounts. This temperature depends on the resin formulation, but it is usually below 100 degrees centigrade. Moreover, this vacuum is preferably maintained for at least fifteen minutes. The processes for evacuating air and for the removal of volatiles, as illustrated in FIGS. 1 and 2, are very similar and can be easily performed simultaneously, if desired.

Figure 3:
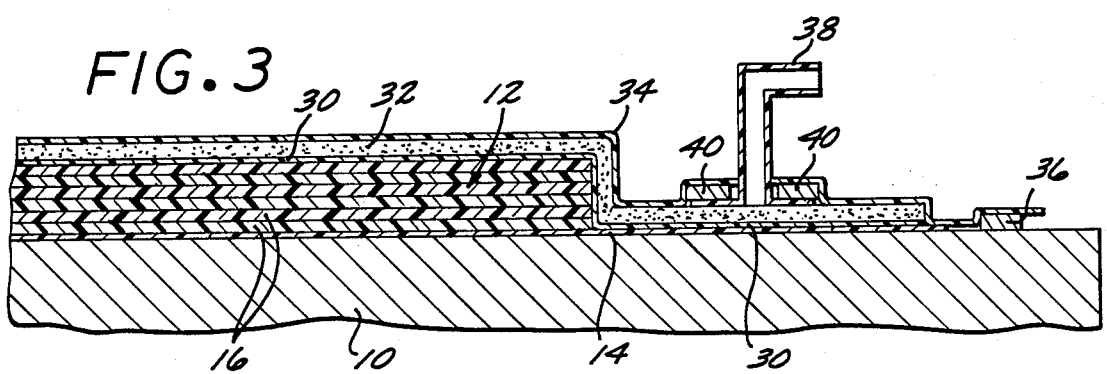
FIG. 3 is a fragmented, sectional schematic view of an exemplary apparatus utilized for the controlled curing of composites, which prevents resin squeeze-out during the curing cycle.

After the volatiles have been satisfactorily removed from the lay-up 12, the peripheral strip of breather material 18a and the interposed release material 28 can be removed from the mold 10 and the lay-up 12, and the method for the controlled curing of composites of this invention can proceed as illustrated best in FIG. 3. In that Figure, the lay-up 12 is covered with an impervious flexible film 30 that forms a seal surrounding the lay-up 12 which prevents the flow of uncured resin during the curing cycle. It is preferred that the impervious flexible film 30 extend beyond the periphery of the lay-up 12 for a minimum distance of 50 millimeters to effect a satisfactory seal. The impervious flexible film 30 is covered with a breather material 32 which provides a cushion tending to uniformly distribute externally applied pressure over the surface area of the impervious flexible film. As illustrated, the breather material 32 is of approximately the same dimensions as the impervious flexible film 30.

The breather material 32 and the impervious flexible film 30 are enclosed within a bag 34 sealed to the mold 10 by means of sealing strips 36 extending generally about the periphery of the bag and placed directly between the bag and the mold. A connecting tube 38 sealed to the bag 34 by additional sealing strips 40 extends through the bag to place the breather material 32 in communication with atmospheric pressure. By venting the breather material 32, pressure applied to the outside of the bag 34 tends to compress the breather material which, in turn, transfers the compressive force to the lay-up 12 in a manner tending the uniformly compress the lay-up in a desirable manner while it is being heated. By preventing any resin squeeze-out from the lay-up 12, and consequently maintaining precise control over the exact resin content within the lay-up, the curing of the lay-up to form a composite structure under the influence of the uniformly distributed pressure results in a very high-strength product. Moreover, the simultaneous heating and pressurization of the lay-up 12 during the curing cycle can be advantageously and economically effected by simply inserting the lay-up, the mold 10 and the enclosing apparatus 12 into an autoclave.

Figure 4:
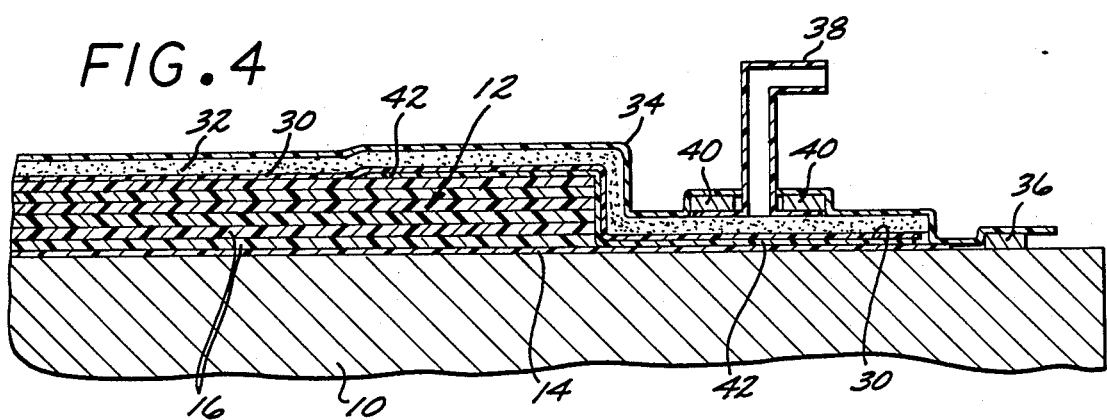
FIG. 4 is a fragmented, sectional schematic view of an exemplary apparatus similar to that shown in FIG. 3, including the addition of adhesive tape about the periphery of the lay-up to further insure prevention of resin squeeze-out.

The method generally illustrated by the apparatus of FIG. 3 can be modified by the addition of a strip of adhesive tape 42 which is applied to overlie the periphery of the lay-up 12 between the outer surface of the lay-up and the inner surface of the impervious flexible film 30. The addition of such an adhesive tape 42 to the system of FIG. 3 is illustrated in FIG. 4. The adhesive tape 42 must be of such a composition that it can withstand the curing temperature without combining with the resin of the lay-up 12. It is preferable that the adhesive tape 42 overlap both the lay-up 12 and the mold 10 for a distance of at least one-quarter of an inch.

Figure 5:
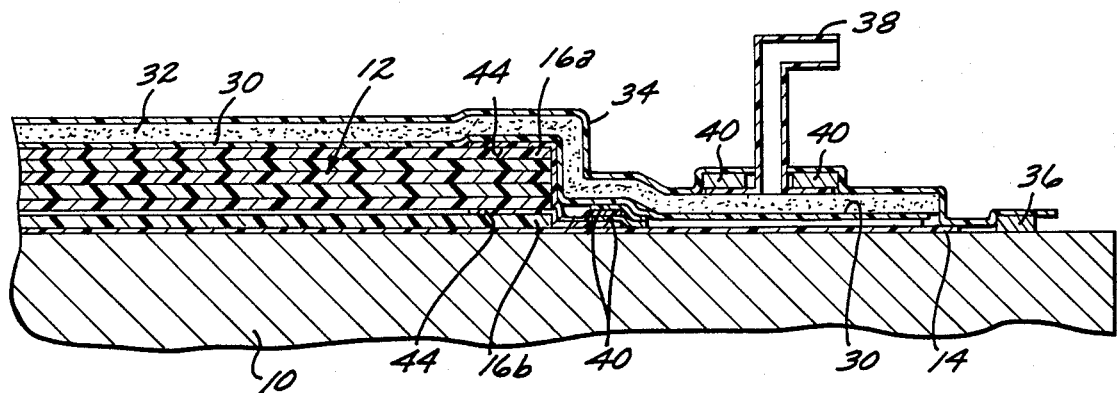
FIG. 5 is a fragmented, sectional schematic view of an exemplary apparatus similar to that shown in FIG. 3, including the addition of a pair of anchoring strips of slightly abrasive material held in place about the periphery of the lay-up by adhesive tape similar to that illustrated in FIG. 4.

Although the drawings show flat molds 10 and flat lay-ups 12, very few composite structures are planar. Therefore, there is sometimes a need to anchor layers 16 of the laminate forming the lay-up, because these layers may tend to move as the viscosity of the resin is lowered during the curing cycle. FIG. 5 illustrates a further step of placing an abrasive material 44 over the upper and lower layers 16a and 16b of fiber reinforcement, and taping the abrasive material to the mold with an adhesive tape 42 similar to that already described in connection with the discussion of FIG. 4. The abrasive material 44 can be glass cloth, sand paper, or other similar materials which will satisfactorily hold the lay-up 12 in the desired position throughout the curing cycle. The function of the adhesive tape 42 is simply to hold the abrasive material 44 adjacent the release material 14.

Of course, the functions of the abrasive material 44 and the adhesive tape 42 as set forth in the discussions of FIGS. 4 and 5 can be combined to both securely anchor the lay-up 12 in a desired position as well as to effect a more complete seal of the resin within the lay-up. In such cases, the adhesive tape 42 should be positioned about the entire periphery of the lay-up 12, and the abrasive material 44 can be simply placed where needed about that periphery.

Figure 6:
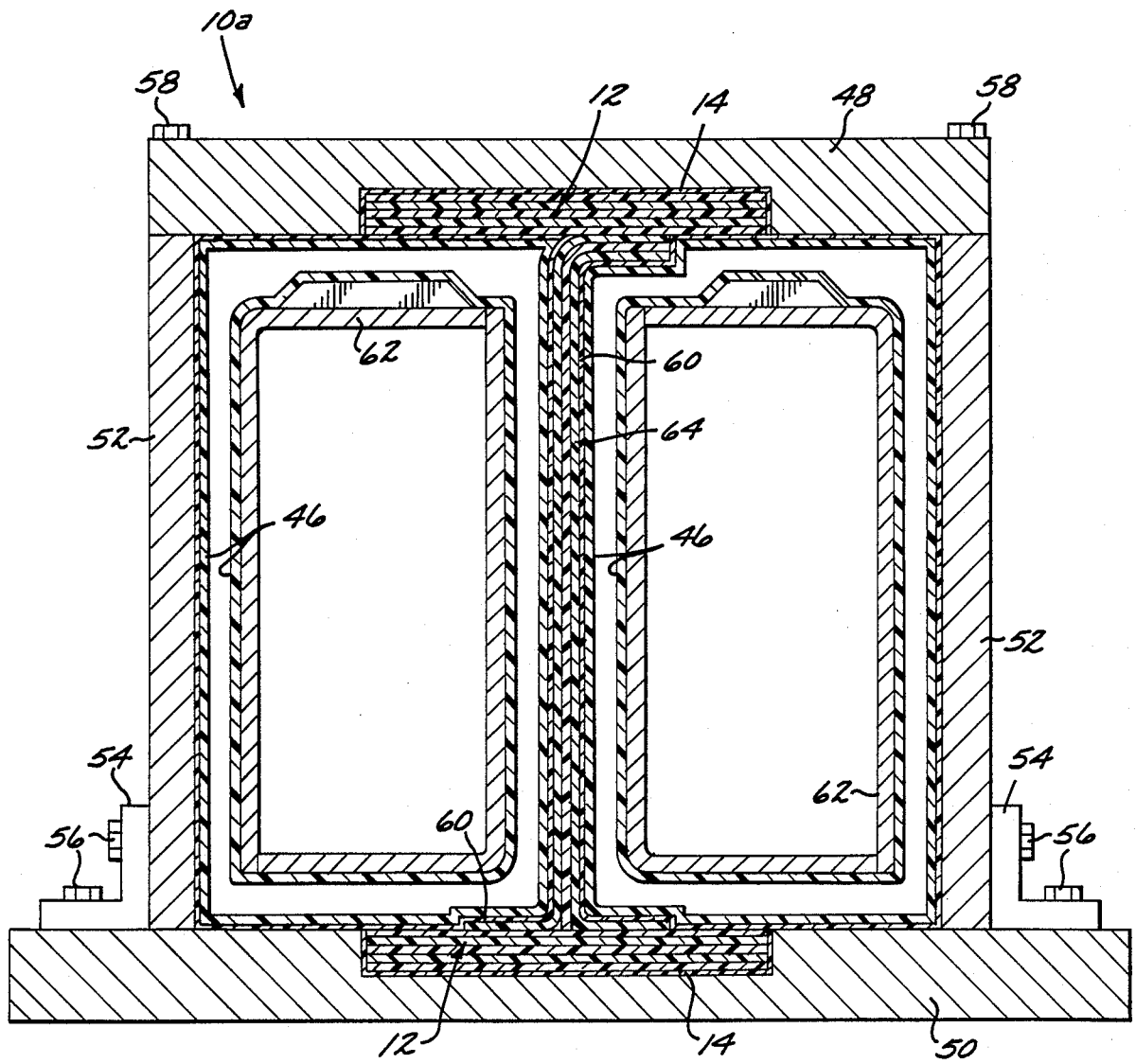
FIG. 6 is a sectional schematic view of an exemplary apparatus utilized for the controlled curing of composites, having inflatable bags which compress the lay-up during the curing cycle while simultaneously preventing any resin squeeze-out.

In a second embodiment of the invention, the same general principles of curing a composite structure while applying a generally uniform compressive force to the lay-up 12 and preventing any resin squeeze-out, is illustrated in FIG. 6 utilizing a different method for applying pressure to the lay-up. In this second embodiment, the pressure applied to the lay-up 12 is provided by an autoclave or other similar means through the use of a pair of elastic or inflatable bags 46 placed internally within the mold 10a. The illustrated mold 10a includes similar upper and lower plates 48 and 50 which are connected to one another by perpendicular walls 52. An angle brace 54 having a pair of bolts 56 is positioned adjacent the junction of each of the walls 52 and the lower plate 50, and the upper plate 48 is directly bolted, by means of two bolts 58, to these walls.

In addition to placing the lay-up 12 adjacent the mold 10a as described in connection with the first embodiment, the lay-up is also placed adjacent the elastic bags 46, and a layer of release material 60 is interposed between each elastic bag and the lay-up. The elastic bags 46 are supported within the mold 10a by special tools 62 which position them to satisfactorily apply the desired compressive force as they are pressurized. Moreover, the pressurization of the inflatable bags 46 effectively seals the lay-up 12 against the mold 10a to prevent the flow of uncured resin from the lay-up.

A portion 64 of the lay-up 12 is positioned between the adjacent inflatable bags 46, and this intermediate portion of the lay-up is advantageously compressed by the oppositely acting forces of the bags as they are pressurized. Thus, the composite structure can be formed utilizing the elastic bags 46 effectively as extensions of the mold 10a. While the inflatable bags 46 may be pressurized in a manner and by means independent of the heating of the lay-up 12, it is preferable that the inflatable bags be pressurized by means of an autoclave system to effect the desired simultaneous pressurization and heating.

From the foregoing, it is to be appreciated that the novel method for controllably curing composites provides very precise control over the resin content of the final composite structure. Although two particular embodiments of the invention have been described in detail for purposes of illustration, various modifications of each may be made without departing from the spirit and scope of the invention. Accordingly, the invention is not to be limited, except as by the appended claims.

What is claimed is:

1. A method of making a composite structure comprising:

applying a release material to a mold;

placing on the mold a preimpregnated lay-up consisting essentially of uncured resin and reinforcing fiber which is to be formed into the composite structure without the loss of resin therefrom;

covering the lay-up with a flexible, fluid impervious film in direct contact therewith and forming a continuous seal between the film and the mold which extends completely around the periphery of the lay-up, thereby completely sealing the lay-up and preventing the flow of uncured resin from the lay-up during the curing thereof;

covering the impervious flexible film with a breather material which uniformly distributes externally applied pressure over the surface area of the impervious flexible film;

enclosing the lay-up, the impervious flexible film in contact with the lay-up, and the covering breather material within a bag sealed to the mold by means of sealing strips extending generally about the periphery of the bag and placed directly between the bag and mold;

venting the breather material to atmospheric pressure; and curing the resin in the lay-up to form the composite structure by heating the lay-up to a resin curing temperature while maintaining a uniformly distributed pressure on the surface of the bag enclosing the lay-up, the impervious film, and the breather material.

2. The method as set forth in claim 1, wherein the lay-up is a laminate, a sandwich or an integrally stiffened part which includes several layers of a fiber reinforcement embedded in a thermosetting resin.

3. A method as set forth in claim 1, wherein the impervious flexible film extends beyond the periphery of the lay-up for a minimum distance of fifty millimeters.

4. A method as set forth in claim 1, wherein the breather material is of approximately the same dimensions as the impervious flexible film.

5. A method as set forth in claim 1, wherein said curing step is accomplished by placing the lay-up, the mold and the enclosing apparatus into an autoclave.

6. A method as set forth in claim 1, including the further step of providing an adhesive tape which can withstand the curing temperature without combining with the resin of the lay-up, the tape being applied to overlie the periphery of the lay-up between the outer surface of the lay-up and the inner surface of the impervious flexible film.

7. A method as set forth in claim 5, wherein the adhesive tape overlaps the lay-up and the mold for a distance of at least one-quarter of an inch.

8. A method as set forth in claim 3, including the further step of placing an abrasive material over one or more layers of the fiber reinforcement and taping the abrasive material to the mold with an adhesive tape which can withstand the curing temperature without combining with the resin of the lay-up.

9. A method as set forth in claim 7, wherein the abrasive material is positioned all around the periphery of the lay-up, as is the adhesive tape, to assure a complete seal of the resin within the impervious flexible film and prevent any movement of the layers of the fiber reinforcement while the lay-up is being cured.

10. A method as set forth in claim 8, wherein the abrasive material is placed over a portion of the top and bottom layers of the fiber reinforcement.

11. A method as set forth in claim 1, further including the step of debulking the lay-up of any entrapped air after the lay-up has been placed on the mold and before the lay-up is covered with the impervious flexible film, said debulking step comprising:
   depositing a strip of breather material about the periphery of the lay-up and directly over the mold covered by the release material;
   enclosing the lay-up and the breather material within a vacuum bag sealed to the mold by means of sealing strips extending generally about the periphery about the vacuum bag and placed directly between the vacuum bag and the mold; and
   connecting the breather material to a vacuum source.

12. A method as set forth in claim 11, wherein a vacuum is maintained for at least ten minutes to assure the evacuation of any air which may be entrapped within the lay-up.

13. A method as set forth in claim 11, wherein the vacuum bag and the peripheral strip of breather material are removed from the mold and the lay-up after said debulking step is completed and before the lay-up is covered with the impervious flexible film.

14. A method as set forth in claim 11, further including the step of removing volatiles from the lay-up before the lay-up is covered with the impervious flexible film, said volatiles removal step comprising:
   depositing a strip of breather material about the periphery of the lay-up;
   interposing a layer of release material between the breather material and the lay-up to prevent resin migration out of the lay-up;
   enclosing the lay-up and the breather material within a vacuum bag sealed to the mold by means of sealing strips extending generally about the periphery of the vacuum bag and placed directly between the vacuum bag and the mold;
   connecting the breather material to a vacuum source; and
   heating the lay-up to a temperature which will permit the escape of volatiles; but will not reduce the viscosity of the resin without the lay-up to a point where it will flow past the release material and the vacuum bag into the breather material in any significant amounts.

15. A method as set forth in claim 14, wherein a vacuum is maintained for at least fifteen minutes.

16. A method as set forth in claim 14, wherein the vacuum bag, the peripheral strip of breather material and the interposed release material are removed from the mold and the lay-up after said volatiles removed step is completed and before the lay-up is covered with the impervious flexible film.

17. A method of making a composite structure comprising:
   applying a release material to a mold;
   placing on the mold a preimpregnated lay-up consisting essentially of uncured resin and reinforcing fibers which is to be formed into the composite structure without the loss of resin therefrom;
   covering exposed surfaces of the lay-up with release material;
   positioning an inflatable bag having an outer flexible, fluid impervious portion adjacent to and in direct contact with the release material covering the exposed surfaces of the lay-up and forming a continuous seal between said portion of the inflatable bag and the mold which extends completely around the periphery of the lay-up thereby completely sealing the lay-up and preventing the flow of uncured resin from the sealed lay-up during the curing thereof; and
   curing the lay-up sealed by the inflatable bag to form the composite structure by heating the sealed lay-up to a resin curing temperature while simultaneously pressurizing the exterior surface of said portion of the inflatable bag, the pressurized inflatable bag applying a generally uniformly distributed pressure on the release material covering the exposed surfaces of the lay-up.

18. A method as set forth in claim 17, wherein the mold generally surrounds the lay-up, and pressurization of the inflatable bag compresses the lay-up during the curing step substantially from the center of the mold outwardly toward the mold, in a manner preventing the flow of uncured resin from the lay-up.

19. A method as set forth in claim 17, wherein at least a portion of the lay-up is positioned between adjacent inflatable bags which compress that portion of the lay-up as the adjacent bags are pressurized, the compression of the lay-up being accomplished without any significant flow of uncured resin from the lay-up.

20. A method as set forth in claim 17, wherein the inflatable bag is pressurized by means of an autoclave system which simultaneously heats the lay-up to a resin curing temperature.

21. A method of making a composite structure comprising:
   applying a release material to a mold;
   placing on the mold a preimpregnated lay-up consisting essentially of uncured resin and reinforcing fibers which is to be formed into the composite structure without the loss of resin therefrom;
   covering the lay-up with flexible, fluid impervious film in direct contact therewith and forming a continuous seal between the film and the mold which extends completely around the periphery of the lay-up, thereby completely sealing the lay-up and preventing the flow of uncured resin from the lay-up during the curing thereof; and
   curing the lay-up to form the composite part by heating the sealed lay-up to a resin curing temperature while maintaining a uniformly distributed external pressure on the surface of the impervious flexible film which seals the lay-up.

22. A method as set forth in claim 21, further including the steps of:
   covering the impervious flexible film with a breather material which provides a cushion tending to uniformly distribute externally applied pressure over the surface area of the impervious flexible film;
   enclosing the lay-up, the impervious flexible film and the breather material within a bag sealed to the mold by means of sealing strips extending generally about the periphery of the bag and placed directly between the bag and the mold; and
   venting the breather material to provide a pressure differential between opposite sides of the bag.

23. A method as set forth in claim 21, further including the step of debulking the lay-up of any entrapped air after the lay-up has been placed on the mold and before the lay-up is covered with the impervious flexible film, said debulking step comprising:

depositing a strip of breather material about the periphery of the lay-up and directly over the mold covered by the release material;

enclosing the lay-up and the breather material within a vacuum bag sealed to the mold by means of sealing strips extending generally about the periphery of the vacuum bag and placed directly between the vacuum bag and the mold; and connecting the breather material to a vacuum source.

24. A method as set forth in claim 21, further including the step of removing volatiles from the lay-up before the lay-up is covered with the impervious flexible film, said volatiles removal step comprising:

depositing a strip of breather material about the periphery of the lay-up;

interposing a layer of release material between the breather material and the lay-up to prevent resin migration out of the lay-up;

enclosing the lay-up and the breather material within a vacuum bag sealed to the mold by means of sealing strips extending generally about the periphery of the vacuum bag and placed directly between the vacuum bag and the mold;

connecting the breather material to a vacuum source; and heating the lay-up to a temperature which will permit the escape of volatiles, but will not reduce the viscosity of the resin within the lay-up to a point where it will flow past the release material and the vacuum bag to the breather material in any significant amounts.

25. a method as set forth in claim 21, wherein the impervious flexible film is a portion of an inflatable bag which is pressurized during the step of curing the lay-up, to compress the lay-up and increase the strength of the resultant composite structure.

26. A method as set forth in claim 23, further including the step of interposing a layer of release material between the breather material and the lay-up to prevent resin migration out of the lay-up, and then heating the lay-up to a temperature which will permit the escape of volatiles, but will not reduce the viscosity of the resin within the lay-up to a point where it will flow past the release material and the vacuum bag into the breather material in any significant amounts.

* * * * *